United States Patent
Lee et al.

(10) Patent No.: US 10,604,399 B2
(45) Date of Patent: Mar. 31, 2020

(54) HOT WATER SUPPLY METHOD, HOT WATER SUPPLY DEVICE, AND WATER PURIFIER USING SAME

(71) Applicant: COWAY CO., LTD., Chungcheongnam-do (KR)

(72) Inventors: Young-Jae Lee, Seoul (KR); Jae-Hoon Kim, Seoul (KR); Jin-Kyu Joung, Seoul (KR)

(73) Assignee: Coway Co., Ltd (KR)

( * ) Notice: Subject to any disclaimer, the term of this patent is extended or adjusted under 35 U.S.C. 154(b) by 320 days.

(21) Appl. No.: 15/575,742

(22) PCT Filed: Apr. 29, 2016

(86) PCT No.: PCT/KR2016/004553
§ 371 (c)(1),
(2) Date: Nov. 20, 2017

(87) PCT Pub. No.: WO2016/186343
PCT Pub. Date: Nov. 24, 2016

(65) Prior Publication Data
US 2018/0354776 A1 Dec. 13, 2018

(30) Foreign Application Priority Data
May 22, 2015 (KR) .................. 10-2015-0071840

(51) Int. Cl.
*B67D 3/00* (2006.01)
*C02F 1/02* (2006.01)
(Continued)

(52) U.S. Cl.
CPC ......... *B67D 3/0022* (2013.01); *B01D 35/005* (2013.01); *B67D 3/0061* (2013.01);
(Continued)

(58) Field of Classification Search
None
See application file for complete search history.

(56) References Cited

U.S. PATENT DOCUMENTS 5,504,306 A * 4/1996 Russell ............... F24H 9/2028
219/497
6,522,834 B1 * 2/2003 Herrick ................ H05B 3/60
222/251
(Continued)

FOREIGN PATENT DOCUMENTS

CN 102103383 6/2011
CN 102235755 11/2011
(Continued)

OTHER PUBLICATIONS

Chinese Office Action dated Sep. 23, 2019 issued in counterpart application No. 201610334917.4, 7 pages.

*Primary Examiner* — Thor S Campbell
(74) *Attorney, Agent, or Firm* — The Farrell Law Firm, P.C.

(57) ABSTRACT

A hot water supply method according to one embodiment of the present invention comprises the steps of: measuring a temperature of water flowing into an water inlet part; turning on a first heater and a second heater if a target temperature is a standard temperature or higher; adjusting a degree of opening and closing of a flow rate adjusting valve on the basis of a difference between the target temperature and the temperature of water flowing into the water inlet part; measuring a temperature of water discharged to a water outlet part; and readjusting the degree of opening and closing of the flow rate adjusting valve on the basis of a difference between the target temperature and the temperature of water discharged to the water outlet part.

21 Claims, 10 Drawing Sheets

(51) Int. Cl.
  G05D 23/19  (2006.01)
  B01D 35/00  (2006.01)
  B01D 35/157  (2006.01)
  G05D 23/30  (2006.01)

(52) U.S. Cl.
  CPC .............. B67D 3/0077 (2013.01); C02F 1/02 (2013.01); G05D 23/1927 (2013.01); *B01D 35/1573* (2013.01); *B67D 3/0025* (2013.01); *C02F 2209/02* (2013.01); *C02F 2209/40* (2013.01); *C02F 2301/08* (2013.01); *G05D 23/30* (2013.01)

(56) References Cited

U.S. PATENT DOCUMENTS

| | | | | |
|---|---|---|---|---|
| 7,574,120 | B2* | 8/2009 | Patterson | F24D 19/1051 |
| | | | | 392/441 |
| 8,068,727 | B2* | 11/2011 | Phillips | F24H 9/2007 |
| | | | | 392/441 |
| 2005/0230490 | A1* | 10/2005 | Pouchak | F23N 5/00 |
| | | | | 237/81 |
| 2011/0139259 | A1* | 6/2011 | Nagata | F24D 19/1072 |
| | | | | 137/1 |
| 2012/0224838 | A1* | 9/2012 | Lee | F24D 19/1006 |
| | | | | 392/466 |
| 2014/0202549 | A1* | 7/2014 | Hazzard | F24H 9/2007 |
| | | | | 137/3 |
| 2014/0321839 | A1* | 10/2014 | Armstrong | F24D 19/1063 |
| | | | | 392/463 |
| 2015/0148971 | A1* | 5/2015 | Acker | F24D 19/1063 |
| | | | | 700/282 |
| 2018/0112891 | A1* | 4/2018 | Muko | F23J 11/12 |
| 2018/0347830 | A1* | 12/2018 | Callahan | F24D 17/0078 |
| 2019/0353399 | A1* | 11/2019 | Glanville | F24H 9/2007 |

FOREIGN PATENT DOCUMENTS

| | | |
|---|---|---|
| CN | 202993569 | 6/2013 |
| CN | 103477157 | 12/2013 |
| CN | 104024761 | 9/2014 |
| JP | 8133395 | 5/1996 |
| KR | 101084005 | 11/2011 |
| KR | 1020120067058 | 6/2012 |
| KR | 1020130079080 | 7/2013 |
| KR | 1020140057420 | 5/2014 |
| WO | WO 2013/100488 | 7/2013 |

* cited by examiner

HOT WATER SUPPLY METHOD, HOT WATER SUPPLY DEVICE, AND WATER PURIFIER USING SAME

PRIORITY

This application is a National Phase Entry of International Application No. PCT/KR2016/004553, which was filed on Apr. 29, 2016, and claims priority to Korean Patent Application Nos. 10-2015-0070400 and 10-2015-0071840, which were filed on May 20, 2015 and May 22, 2015, respectively, the contents of each of which are incorporated herein by reference.

TECHNICAL FIELD

The present disclosure relates to a hot water supply method, a hot water supply device, and a water purifier using the same.

BACKGROUND ART

Recently, research into direct water type water purifiers supplying hot water using instantaneous water heaters has been increasingly undertaken.

A conventional direct water type water purifier supplies hot water using a plurality of heating devices controlling the temperature of hot water by adjusting a level of power supplied to the heating devices with a fixed flow rate or adjusting the flow rate with a fixed amount of power being supplied to the heating devices.

However, a method of adjusting a level of power supplied to a plurality of heating devices or high-capacity heating devices may cause electromagnetic interference (EMI) and may cause harmonics and flickering, resulting in loss of control of discharge temperature within a predetermined narrow temperature range. Both of the two methods are required to discharge water passing through a hot water supply device through a drain until hot water having a target temperature is generated, thereby requiring a standby time for the generation of the hot water having the target temperature.

Further, the water inlet pressure of the conventional direct water type water purifier may vary according to installation areas and installation conditions. A direct water type hot water supply device 10 controlling the temperature of hot water by adjusting a flow rate or a level of power supplied to heaters may not generate hot water having a target temperature when water inlet pressure changes.

DISCLOSURE

Technical Problem

An aspect of the present disclosure may provide a hot water supply method, a hot water supply device, and a water purifier using the same, which may heat water using only a first heater and adjust a flow rate according to a temperature of water discharged to a discharge unit when a target temperature is lower than a reference temperature, and may heat water using the first heater and a second heater, adjust the flow rate and heating capacity of the second heater according to a temperature of water flowing into a water inlet part, and readjust the flow rate according to a temperature of water discharged to the discharge unit when the target temperature is equal to or higher than the reference temperature, thereby preventing electromagnetic interference (EMI), harmonics, and flickering from occurring, further extending a temperature range of hot water that may be generated, heating water to a target temperature without a standby time, and supplying the water.

An aspect of the present disclosure may provide a hot water supply method, a hot water supply device, and a water purifier using the same, which may store a plurality of lookup tables for controlling a flow rate according to water inlet pressure, select a proper lookup table according to the water inlet pressure, and control the flow rate, based on the selected proper lookup table, thereby generating hot water having a desired temperature, regardless of changes in the water inlet pressure, according to installation locations or installation conditions.

An aspect of the present disclosure may provide a hot water supply method, a hot water supply device, and a water purifier using the same, which may store a plurality of lookup tables for controlling power of first and second heaters according to water inlet pressure, select a proper lookup table according to the water inlet pressure, and control heating capacities of the first and second heater, based on the selected proper lookup table, thereby generating hot water having a desired temperature, regardless of changes in the water inlet pressure, according to installation locations or installation conditions.

Technical Solution

According to an aspect of the present disclosure, a hot water supply method using a hot water supply device including a first heater and a second heater disposed between a water inlet part and a water outlet part and a flow rate adjusting valve adjusting a flow rate of water discharged to the water outlet part may include: measuring a temperature of water flowing into the water inlet part; when a target temperature is lower than a first reference temperature, adjusting a degree of opening and closing of the flow rate adjusting valve, based on a difference between the temperature of water flowing into the water inlet part and the target temperature; calculating heating capacities of the first heater and the second heater, based on the difference between the temperature of water flowing into the water inlet part and the target temperature; driving the first heater and the second heater using the calculated heating capacities; measuring a temperature of water discharged to the water outlet part; and readjusting a degree of opening and closing of the flow rate adjusting valve, based on a difference between the temperature of water discharged to the water outlet part and the target temperature.

The hot water supply method may further include: after readjusting the degree of opening and closing of the flow rate adjusting valve, readjusting the heating capacity of the second heater, based on the difference between the temperature of water discharged to the water outlet part and the target temperature.

The adjusting of the degree of opening and closing of the flow rate adjusting valve may include: reducing a degree of opening of the flow rate adjusting valve, in proportion to the difference between the temperature of water flowing into the water inlet part and the target temperature.

The adjusting of the degree of opening and closing of the flow rate adjusting valve may include: measuring water inlet pressure of the flowing water; selecting any one of a plurality of prestored lookup tables for a degree of opening and closing of the flow rate adjusting valve according to a difference between a target temperature and a temperature of the water, based on the measured water inlet pressure; and adjusting the degree of opening and closing of the flow rate adjusting valve using the selected lookup table.

The adjusting of the degree of opening and closing of the flow rate adjusting valve may include: readjusting the degree of opening and closing of the flow rate adjusting valve using the selected lookup table.

The calculating of the heating capacities of the first heater and the second heater may include: when the difference between the target temperature and the temperature of the flowing water is equal to or higher than a second reference temperature, setting the heating capacity of the first heater to the maximum heating capacity; and calculating the heating capacity of the second heater using the heating capacity of the first heater, the degree of opening and closing of the flow rate adjusting valve, and the difference between the temperature of water flowing into the water inlet part and the target temperature.

The calculating of the heating capacities of the first heater and the second heater may include: when the difference between the target temperature and the temperature of the flowing water is lower than a second reference temperature, setting the heating capacity of the first heater to 0; and calculating the heating capacity of the second heater using the degree of opening and closing of the flow rate adjusting valve and the difference between the temperature of water flowing into the water inlet part and the target temperature.

The calculating the heating capacities of the first heater and the second heater may include: measuring water inlet pressure of the flowing water; selecting any one of a plurality of prestored lookup tables for the heating capacities of the first heater and the second heater according to a difference between a target temperature and a temperature of the water, based on the measured water inlet pressure; and calculating the heating capacities of the first heater and the second heater using the selected lookup table.

The hot water supply method may further include: when the target temperature is equal to or higher than the first reference temperature, between the measuring of the temperature of water flowing into the water inlet part and the measuring of the temperature of water discharged to the water outlet part, adjusting the degree of opening and closing of the flow rate adjusting valve, based on the difference between the temperature of water flowing into the water inlet part and the target temperature; and driving the first heater and the second heater using the maximum heating capacity.

The adjusting of the degree of opening and closing of the flow rate adjusting valve may include: reducing the degree of opening of the flow rate adjusting valve, in proportion to the difference between the temperature of water flowing into the water inlet part and the target temperature.

The readjusting of the degree of opening and closing of the flow rate adjusting valve may include: reducing the degree of opening of the flow rate adjusting valve, in proportion to the difference between the temperature of water flowing into the water outlet part and the target temperature.

According to an aspect of the present disclosure, a hot water supply device may include: a first heater and a second heater disposed between a water inlet part and a water outlet part; a first temperature sensor generating first temperature information by measuring a temperature of water flowing into the water inlet part; a second temperature sensor generating second temperature information by measuring a temperature of water discharged to the water outlet part; a flow rate adjusting valve adjusting a flow rate of water discharged to the water outlet part; and a controller driving the first heater or the second heater according to a target temperature, adjusting a degree of opening and closing of the flow rate adjusting valve, based on a difference between a first temperature corresponding to the first temperature information and the target temperature, and readjusting the degree of opening and closing of the flow rate adjusting valve, based on a difference between a second temperature corresponding to the second temperature information and the target temperature.

The controller may readjust heating capacity of the second heater, based on the difference between the second temperature and the target temperature.

The controller may calculate heating capacities of the first heater and the second heater, based on the degree of opening and closing of the flow rate adjusting valve and the difference between the first temperature and the target temperature, may drive the first heater and the second heater using the calculated heating capacities.

When the target temperature is equal to or higher than a first reference temperature, the controller may drive the first heater and the second heater using the maximum heating capacity.

When the target temperature is lower than a first reference temperature and the difference between the target temperature and the temperature of the flowing water is equal to or higher than a second reference temperature, the controller may drive the first heater using the maximum heating capacity, may calculate heating capacity of the second heater using heating capacity of the first heater, the degree of opening and closing of the flow rate adjusting valve and the difference between the target temperature and the first temperature, and may drive the second heater using the calculated heating capacity.

When the target temperature is lower than a first reference temperature and the difference between the target temperature and the temperature of the flowing water is lower than a second reference temperature, the controller may turn off the first heater, may calculate heating capacity of the second heater using the degree of opening and closing of the flow rate adjusting valve and the difference between the target temperature and the first temperature, and may drive the second heater using the calculated heating capacity.

The controller may calculate heating capacity of the first heater and heating capacity of the second heater using a second lookup table for the heating capacities of the first heater and the second heater, according to the degree of opening and closing of the flow rate adjusting valve and the difference between the first temperature and the target temperature.

The controller may reduce the degree of opening of the flow rate adjusting valve, in proportion to the difference between the first temperature and the target temperature.

The hot water supply device may further include: a purified water generator generating purified water by filtering flowing water; a purified water extractor extracting the purified water; and a purified water flow rate detector detecting a flow rate of the purified water extracted by the purified water extractor, in which the purified water generated by the purified water generator may flow into the water inlet part, and the controller may calculate water inlet pressure of the water flowing into the purified water generator using the flow rate of the extracted purified water, may store a plurality of lookup tables for a flow rate or hot water according to the difference between the target temperature and the first temperature, may select any one of the lookup tables according to the calculated water inlet pressure, and may adjust the degree of opening and closing of the flow rate adjusting valve using the selected lookup table.

When the second temperature does not reach the target temperature, the controller may readjust the degree of opening and closing of the flow rate adjusting valve using the selected lookup table.

The controller may include: a water inlet pressure calculator calculating the water inlet pressure of the water flowing into the purified water generator using the flow rate of the extracted purified water; a first lookup table storage storing a plurality of lookup tables for a flow rate of hot water according to a difference between the target temperature and a temperature of the purified water; and a flow rate adjusting valve controller selecting any one of the lookup tables according to the calculated water inlet pressure, and adjusting the degree of opening and closing of the flow rate adjusting valve using the selected lookup table.

The controller may reduce the degree of opening of the flow rate adjusting valve, in proportion to the difference between the second temperature and the target temperature.

The controller may include: a calculator calculating the degree of opening and closing of the flow rate adjusting valve, based on the difference between the first temperature and the target temperature, calculating heating capacities of the first heater and the second heater, based on a magnitude of the target temperature, the degree of opening and closing of the flow rate adjusting valve, and the difference between the first temperature and the target temperature, and recalculating the degree of opening and closing of the flow rate adjusting valve or the heating capacity of the second heater, based on the difference between the second temperature and the target temperature; a heater controller driving the first heater and the second heater using the calculated heating capacities; and a flow rate adjusting valve controller controlling the flow rate adjusting valve according to the calculated opening and closing degree.

The hot water supply device may further include: a purified water generator generating purified water by filtering flowing water; a purified water extractor extracting the purified water; and a purified water flow rate detector detecting a flow rate of the purified water extracted by the purified water extractor, in which the purified water generated by the purified water generator may flow into the water inlet part, and the controller may calculate water inlet pressure of the water flowing into the purified water generator using the flow rate of the extracted purified water, may store a plurality of lookup tables for heating capacities of the first heater and the second heater according to the difference between the target temperature and the first temperature, may select any one of the lookup tables according to the calculated water inlet pressure, and may adjust the heating capacity of the first heater or the second heater using the selected lookup table.

The controller may include: a water inlet pressure calculator calculating the water inlet pressure of the water flowing into the purified water generator using the flow rate of the extracted purified water; a second lookup table storage storing a plurality of lookup tables for power according to the difference between the target temperature and the first temperature; and a heater controller selecting any one of the lookup tables according to the calculated water inlet pressure, and adjusting the heating capacity of the first heater or the second heater using the selected lookup table.

According to an aspect of the present disclosure, a water purifier including the hot water supply device may be provided.

Advantageous Effects

According to an exemplary embodiment in the present disclosure, the present disclosure is provided to solve the foregoing problems of the related art, and may heat water using only a first heater and adjust a flow rate and heating capacity according to a temperature of water discharged to a water outlet part and a temperature of flowing water when a target temperature is lower than a reference temperature, and may heat water using the first heater and a second heater, adjust the flow rate and heating capacity of the second heater according to a temperature of water flowing into a water inlet part, and readjust the flow rate according to a temperature of water discharged to the water outlet part when the target temperature is equal to or higher than the reference temperature, thereby preventing electromagnetic interference (EMI), harmonics, and flickering from occurring, further extending a temperature range of hot water that may be generated, heating water to the target temperature without a standby time, and supplying the water.

Further, a plurality of lookup tables for controlling a flow rate according to water inlet pressure, or a plurality of lookup tables for controlling a level of power supplied to a heater according to the water inlet pressure may be stored, a proper lookup table may be selected according to the water inlet pressure, and the flow rate may be controlled, based on the selected proper lookup table, thereby generating hot water having a desired temperature, regardless of changes in the water inlet pressure, according to installation locations or installation conditions.

BEST MODE FOR INVENTION

Figure 1:
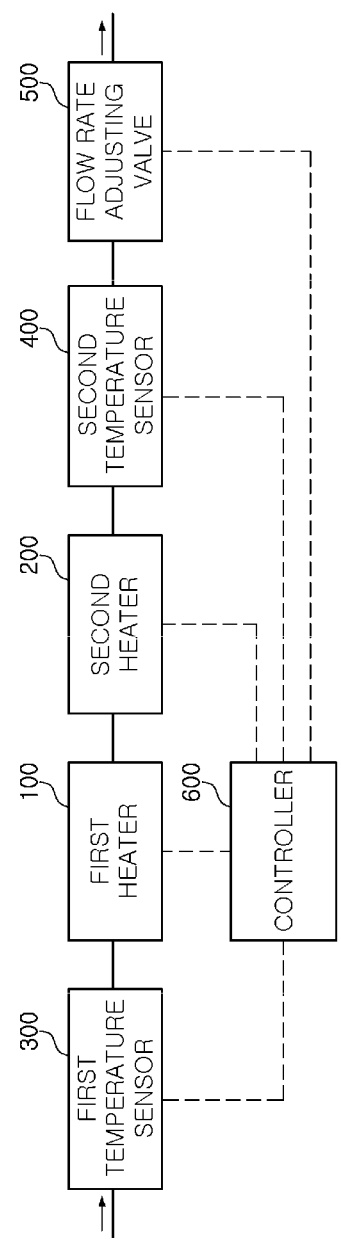
FIG. 1 is a block diagram illustrating a hot water supply device, according to an exemplary embodiment in the present disclosure.

Exemplary embodiments in the present disclosure will be described hereinafter with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art.

In the drawings, the same reference numerals will be used throughout to designate the same or like elements, and the shapes and dimensions of elements may be exaggerated for clarity.

FIG. 1 is a block diagram illustrating a hot water supply device, according to an exemplary embodiment in the present disclosure.

Referring first to FIG. 1, the hot water supply device, according to an exemplary embodiment in the present disclosure, may include a first heater 100, a second heater 200, a first temperature sensor 300, a second temperature sensor 400, a flow rate adjusting valve 500, and a controller 600.

Here, the hot water supply device may heat water supplied from an external source to a target temperature preset or input by a user, may discharge the water, and may include a water inlet part (not illustrated) into which water may flow from the outside and a water outlet part (not illustrated) which may allow the heated water to be discharged externally.

The first heater 100 may be disposed between the water inlet part and the water outlet part, and may heat water flowing into the water inlet part. Heating capacity of the first heater 100 may be controlled by the controller 600. In an exemplary embodiment, the heating capacity of the first heater 100 controlled by the controller 600 may be 0 or the maximum heating capacity. That is, the first heater 100 may be turned on (driven using the maximum heating capacity) or off (when the heating capacity is 0) by the controller 600.

The second heater 200 may be disposed between the water inlet part and the water outlet part, and may heat water flowing into the water inlet part. Heating capacity of the second heater 200 may be controlled by the controller 600. Here, the heating capacity of the second heater 200 may be adjusted to have a value of 0 to 100% of the maximum heating capacity, which may be adjusted by controlling power supplied to the second heater 200.

In an exemplary embodiment, the heating capacity of the second heater 200 may be controlled using a phase control method or a zero-crossing method, and the heating capacity of the second heater 200 may also be controlled using a method of selectively inputting only a portion of a voltage waveform of power applied to the second heater 200.

In an exemplary embodiment, the first heater 100 may be a heating device that may only be controlled to be turned on/off, and the second heater 200 may be configured in a manner of adjusting heating capacity. As such, the first heater 100 may heat water flowing into the water inlet part using the heating capacity set by the on/off control of the controller 600, and the second heater 200 may heat water discharged to the water outlet part using the heating capacity adjusted by the controller 600 according to a difference between a temperature of the water flowing into the water inlet part and the target temperature, thus solving a problem, such as electromagnetic interference (EMI) or harmonics, that may occur in controlling a plurality of heaters or a high capacity heater.

The first temperature sensor 300 may measure the temperature of water flowing into the water inlet part to generate first temperature information. The first temperature sensor 300 may output the first temperature information to the controller 600.

The second temperature sensor 400 may measure a temperature of water discharged through the water outlet part to generate second temperature information. The second temperature sensor 400 may output the second temperature information to the controller 600.

Here, the first temperature sensor 300 and the second temperature sensor 400 may be any well-known sensors as long as they may measure a temperature of water to generate temperature information corresponding to the temperature of water.

The flow rate adjusting valve 500 may adjust a flow rate of water discharged through the water outlet part by the control of the controller 600. In an exemplary embodiment, the flow rate adjusting valve 500 may include a valve (not illustrated) installed to adjust the flow rate of water discharged through the water outlet part, and a motor (not illustrated) adjusting a degree of opening and closing of the valve according to a control signal input from the controller 600. Here, the opening and closing degree may correspond to a flow rate of water discharged through the water outlet part, may be proportionate to a magnitude of the flow rate, and may refer to a level of opening and closing of the valve or an area of opening or closing of the valve.

The controller 600 may control the overall operation of the hot water supply device. In detail, the controller 600 may receive the first temperature information and the second temperature information from the first temperature sensor 300 and the second temperature sensor 400. Further, the controller 600 may adjust the degree of opening and closing of the flow rate adjusting valve 500 using the first temperature information. Further, the controller 600 may calculate the heating capacities of the first heater 100 and the second heater 200, and may drive the first heater 100 and the second heater 200 using the calculated heating capacities. Further, the controller 600 may readjust the degree of opening and closing of the flow rate adjusting valve 500 using the second temperature information. In an exemplary embodiment, the controller 600 may readjust the heating capacity of the second heater 200 using the second temperature information.

In detail, when water flows into the water inlet part, the controller 600 may first measure a first temperature $T_1$ of water flowing into the water inlet part, and may adjust the degree of opening and closing of the flow rate adjusting valve 500 according to a target temperature $T_t$ input by a user or preset.

In an exemplary embodiment, the controller 600 may adjust the degree of opening and closing of the flow rate adjusting valve 500 according to a difference between the target temperature $T_t$ and the first temperature $T_1$ of water flowing into the water inlet part, and may reduce the degree of opening of the flow rate adjusting valve 500 as the difference increases.

In another exemplary embodiment, the controller 600 may adjust the degree of opening and closing of the flow rate adjusting valve 500 using a lookup table for the degree of opening and closing of the flow rate adjusting valve 500 according to the difference between the first temperature $T_1$ of water flowing into the water inlet part and the target temperature $T_t$.

Next, the controller 600 may calculate the heating capacities of the first heater 100 and the second heater 200 according to a magnitude of the target temperature $T_t$, and may drive the first heater 100 and the second heater 200 using the calculated heating capacities.

In more detail, when the magnitude of the target temperature $T_t$ is equal to or higher than a first reference temperature $T_{s1}$, the controller 600 may set the heating capacities of the first heater 100 and the second heater 200 to the maximum heating capacity to drive the first heater 100 and the second heater 200.

Here, when the magnitude of the target temperature $T_t$ is lower than the first reference temperature $T_{s1}$ and is equal to or higher than a second reference temperature $T_{s2}$, the controller 600 may set the heating capacity of the first heater 100 to the maximum heating capacity, and may calculate the heating capacity of the second heater 200 using the heating capacity of the first heater 100, the degree of opening and closing of the flow rate adjusting valve 500, and the difference between the temperature $T_1$ of water flowing into the water inlet part and the target temperature $T_t$.

Here, when the magnitude of the target temperature $T_t$ is lower than the second reference temperature $T_{s2}$, the controller 600 may set the heating capacity of the first heater 100 to 0, and may calculate the heating capacity of the second heater 200 using the degree of opening and closing of the flow rate adjusting valve 500 and the difference between the temperature $T_1$ of water flowing into the water inlet part and the target temperature $T_t$.

Here, the controller 600 may calculate the heating capacities of the first heater 100 and the second heater 200 using a lookup table for the heating capacities of the first heater 100 and the second heater 200 according to the degree of opening and closing of the flow rate adjusting valve 500 and the difference between the temperature $T_1$ of water flowing into the water inlet part and the target temperature $T_t$.

In an exemplary embodiment, the controller 600 may set the heating capacity of the first heater 100 to 0 or the maximum heating capacity, which may be simple on/off control. That is, the first heater 100 may be a heater that may be turned on or off using the maximum heating capacity. When the magnitude of the target temperature $T_t$ is lower than the first reference temperature $T_{s1}$ and is equal to or higher than the second reference temperature $T_{s2}$, in a state in which the first heater 100 may be turned on, the controller 600 may calculate the heating capacity of the second heater 200 for heating the water to the target temperature, and may drive the second heater 200 using the calculated heating capacity, and when the magnitude of the target temperature $T_t$ is lower than the second reference temperature $T_{s2}$, in a state in which the first heater 100 may be turned off, the controller 600 may calculate the heating capacity of the second heater 200 for heating the water to the target temperature, and may drive the second heater 200 using the calculated heating capacity.

Next, the controller 600 may readjust the degree of opening and closing of the flow rate adjusting valve 500, based on a difference between a second temperature $T_2$ of water discharged to the water outlet part and the target temperature $T_t$.

In an exemplary embodiment, the controller 600 may reduce the degree of opening of the flow rate adjusting valve 500 in proportion to the difference between the second temperature $T_2$ of water discharged to the water outlet part and the target temperature $T_t$.

In another exemplary embodiment, the controller 600 may adjust the degree of opening and closing of the flow rate adjusting valve 500 using a lookup table for the degree of opening and closing of the flow rate adjusting valve 500 according to the difference between the second temperature $T_2$ of water discharged to the water outlet part and the target temperature $T_t$.

In an exemplary embodiment, the controller 600 may include at least one processing unit and memory. Here, the processing unit may include, for example, a central processing unit (CPU), a graphic processing unit (GPU), a microprocessor, an application specific integrated circuit (ASIC), field programmable gate arrays (FPGAs), or the like, and may have a plurality of cores. The memory may be a volatile memory, a non-volatile memory, or any combination thereof.

The controller 600 will be described hereinafter in more detail, with reference to FIG. 2.

Figure 2:
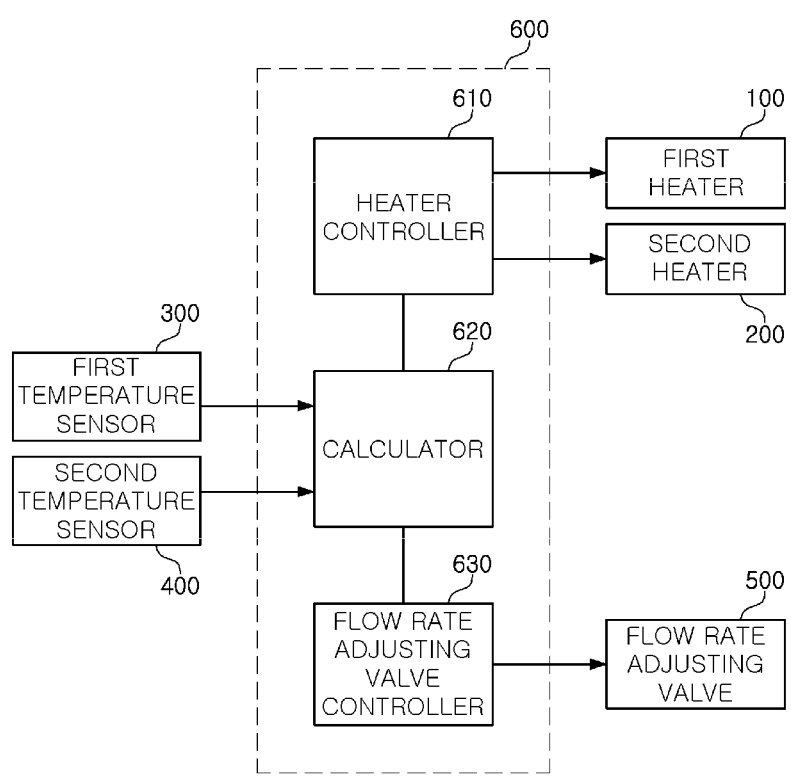
FIG. 2 is a block diagram illustrating an exemplary embodiment of a control unit of FIG. 1.

FIG. 2 is a block diagram illustrating an exemplary embodiment of the control unit of FIG. 1.

Referring to FIG. 2, the controller 600, according to an exemplary embodiment in the present disclosure, may include a heater controller 610, a calculator 620, and a flow rate adjusting valve controller 630.

The heater controller 610 may drive the first heater 100 and the second heater 200 using heating capacities calculated by the calculator 620.

Here, the heater controller 610 may adjust the heating capacities of the first heater 100 and the second heater 200 by adjusting a magnitude of power supplied to the first heater 100 and the second heater 200. In an exemplary embodiment, the heater controller 610 may control the first heater 100 to be turned on/off and adjust the heating capacity of the second heater 200 by adjusting power supplied to the second heater 200, according to the heating capacity calculated by the calculator 620.

The calculator 620 may calculate the degree of opening and closing of the flow rate adjusting valve 500 and the heating capacities of the first heater 100 and the second heater 200.

In detail, the calculator 620 may receive the first temperature information (temperature information on water flowing into the water inlet part) input from the first temperature sensor 300 and the second temperature information (temperature information on water discharged to the water outlet part) input from the second temperature sensor 400, may calculate the degree of opening and closing of the flow rate adjusting valve 500, based on a difference between a first temperature $T_1$ corresponding to the first temperature information and the target temperature $T_t$, and recalculate the degree of opening and closing of the flow rate adjusting valve 500 and the heating capacity of the second heater 200, based on a difference between a second temperature $T_2$ corresponding to the second temperature information and the target temperature $T_t$.

Here, the calculator 620 may receive the first temperature information and the second temperature information from the first temperature sensor 300 and the second temperature sensor 400, and although not illustrated in the drawings, may receive the target temperature from the outside.

The calculator 620 may compare the target temperature $T_t$ to the first reference temperature $T_{s1}$ or the second reference temperature $T_{s2}$. The first reference temperature $T_{s1}$ may be a temperature higher than the second reference temperature $T_{s2}$.

Here, when the target temperature $T_t$ is equal to or higher than the first reference temperature $T_{s1}$, the calculator 620 may set the heating capacities of the first heater 100 and the second heater 200 to the maximum heating capacity.

Further, when the target temperature $T_t$ is lower than the first reference temperature $T_{s1}$ and is equal to or higher than the second reference temperature $T_{s2}$, the calculator 620 may set the heating capacity of the first heater 100 to the maximum heating capacity, and may calculate the heating capacity of the second heater 200, based on the heating capacity of the first heater 100, the degree of opening and closing of the flow rate adjusting valve 500, and the difference between the first temperature $T_1$ and the target temperature $T_t$.

Further, when the target temperature $T_t$ is lower than the second reference temperature $T_{s2}$, the calculator 620 may set the heating capacity of the first heater 100 to 0, and may calculate the heating capacity of the second heater 200, based on the degree of opening and closing of the flow rate adjusting valve 500 and the difference between the temperature $T_1$ and the target temperature $T_t$.

The calculator 620 may provide the calculated heating capacities of the first heater 100 and the second heater 200 to the heater controller 610, and may provide the calculated degree of opening and closing of the flow rate adjusting valve 500 to the flow rate adjusting valve controller 630.

The flow rate adjusting valve controller 630 may control an opening and closing operation of the flow rate adjusting valve 500 according to the opening and closing degree calculated by the calculator 620.

Figure 3:
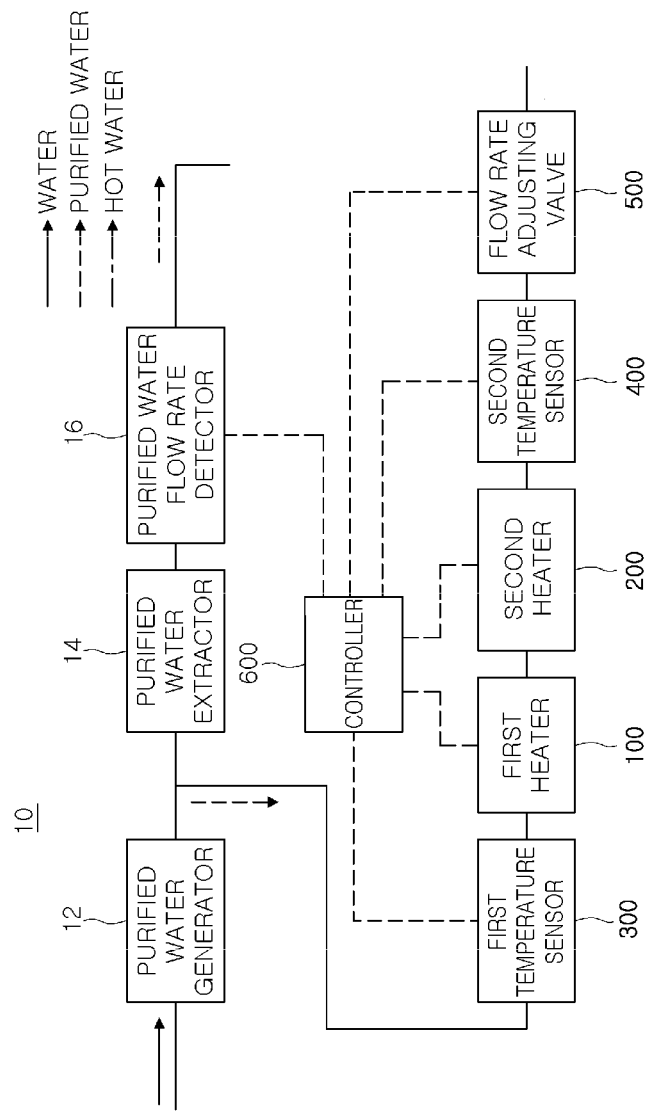
FIG. 3 is a block diagram illustrating a hot water supply device, according to another exemplary embodiment in the present disclosure.

FIG. 3 is a block diagram illustrating a hot water supply device, according to another exemplary embodiment in the present disclosure.

An exemplary embodiment of FIG. 3 is the same as that of FIG. 1 in basic configuration. However, the hot water supply device may further include a purified water generator 12, a purified water extractor 14, and a purified water flow rate detector 16.

The purified water generator 12 may filter water flowing from a water source (not illustrated) to generate purified water. Here, the purified water generator 12 may include at least one filter, and the generated purified water may be extracted by the purified water extractor 14, or may be heated by the first heater 100 and the second heater 200 so that the purified water may be discharged as hot water.

The purified water extractor 14 may extract purified water generated by the purified water generator 12.

The purified water flow rate detector 16 may detect a flow rate of purified water extracted by the purified water extractor 14. Here, the purified water flow rate detector 16 may be a flow rate sensor detecting a flow rate. The purified water flow rate detector 16 may detect a flow rate of purified water extracted by the purified water extractor 14 to generate information on the flow rate of the extracted purified water, and may output the information on the flow rate of the extracted purified water to the controller 600.

Here, the controller 600 may adjust the degree of opening and closing of the flow rate adjusting valve 500 for heating the purified water to a desired temperature (a target temperature). At this time, a plurality of lookup tables for a hot water flow rate according to a difference between the target temperature and a temperature of water for adjusting the degree of opening and closing of the flow rate adjusting valve 500 may be used.

Here, the target temperature may be a preset temperature or a temperature of hot water input by a user. Further, the lookup tables may be lookup tables per water inlet pressure. For example, the controller 600 may include a first lookup table for a hot water flow rate according to a difference between a target temperature and a temperature of water when water inlet pressure is 20 PSI, a second lookup table for a hot water flow rate according to a difference between a target temperature and a temperature of water when water inlet pressure is 30 PSI, and a third lookup table for a hot water flow rate according to a difference between a target temperature and a temperature of water when water inlet pressure is 40 PSI, or the like.

The controller 600 may first control the purified water extractor 14 to extract purified water generated by the purified water generator 12.

When the purified water is extracted by the purified water extractor 14, the purified water flow rate detector 16 may detect a flow rate of the extracted purified water to generate information on the flow rate of the extracted purified water, and may output the information on the flow rate of the extracted purified water to the controller 600.

The controller 600 may calculate water inlet pressure of water flowing into the purified water generator 12 from the water source, based on the received information on the flow rate of the extracted purified water. Here, the information on the flow rate of the extracted purified water may include the flow rate of the extracted purified water, and the flow rate of the extracted purified water may be proportionate to the water inlet pressure.

Next, the controller 600 may select any one of the lookup tables, based on the calculated water inlet pressure. For example, when water inlet pressure corresponding to information on a flow rate of extracted purified water input from the purified water flow rate detector 16 is 20 PSI, the controller 600 may select the first lookup table of the lookup tables.

Next, the controller 600 may adjust a temperature of hot water by adjusting a flow rate of hot water using the selected lookup table.

Here, the water inlet pressure may vary according to installation areas and installation conditions of the hot water supply device. However, in the case of a direct water type hot water supply device adjusting a temperature of hot water by adjusting a flow rate, when water inlet pressure varies, a problem may occur in which hot water having a target temperature may not be generated.

To solve such a problem, as described above, a hot water supply device 10, according to an exemplary embodiment in the present disclosure, may store a plurality of lookup tables for controlling a flow rate according to water inlet pressure, may select a proper lookup table according to the water inlet pressure, and may control the flow rate, based on the selected proper lookup table, thereby generating hot water having a desired temperature, regardless of changes in the water inlet pressure, according to installation locations or installation conditions.

In an exemplary embodiment, the controller 600 may calculate water inlet pressure, when a user inputs initial settings, or in each preset cycle, and may select a lookup table according to the calculated water inlet pressure.

The controller 600 may compare a second temperature corresponding to second temperature information generated by the second temperature sensor 400 to a target temperature, to readjust the flow rate adjusting valve 500 according to a difference between the two temperatures. Here, the controller 600 may readjust the flow rate adjusting valve 500 using the selected lookup table.

The hot water supply device, according to the present exemplary embodiment, may generate hot water having a desired temperature more accurately by readjusting the flow rate adjusting valve 500 according to a difference between a temperature of discharged hot water and a target temperature.

Figure 4:
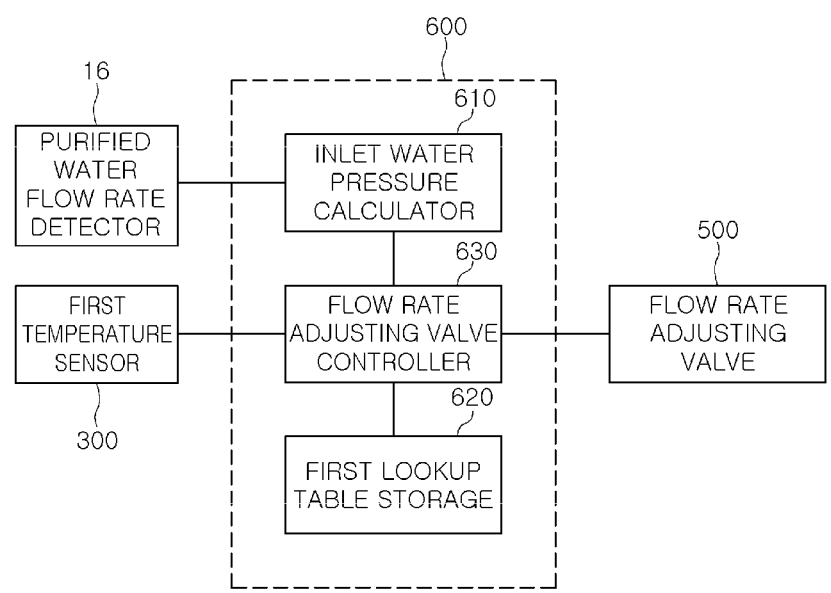
FIG. 4 is a block diagram illustrating an exemplary embodiment of a control unit of FIG. 3.

FIG. 4 is a block diagram illustrating an exemplary embodiment of the control unit of FIG. 3.

Referring to FIG. 4, the controller 600, according to an exemplary embodiment in the present disclosure, may include a water inlet pressure calculator 610, a first lookup table storage 620, and a flow rate adjusting valve controller 630.

The water inlet pressure calculator 610 may calculate water inlet pressure of water flowing into the purified water generator 12, based on a flow rate of extracted purified water corresponding to information on a flow rate of extracted purified water input from the purified water flow rate detector 16. Here, the relationship between the flow rate of extracted purified water and the water inlet pressure may be produced using a lookup table according to a previously experimentally calculated or obtained result, or using a formula obtained by the relationship.

The first lookup table storage 620 may store a plurality of lookup tables for a flow rate of hot water according to a difference between a target temperature and a temperature of water per water inlet pressure.

The flow rate adjusting valve controller 630 may select any one of the lookup tables stored in the first lookup table storage 620 according to the water inlet pressure calculated by the water inlet pressure calculator 610, and may adjust the degree of opening and closing of the flow rate adjusting valve 500 using the selected lookup table.

Figure 5:
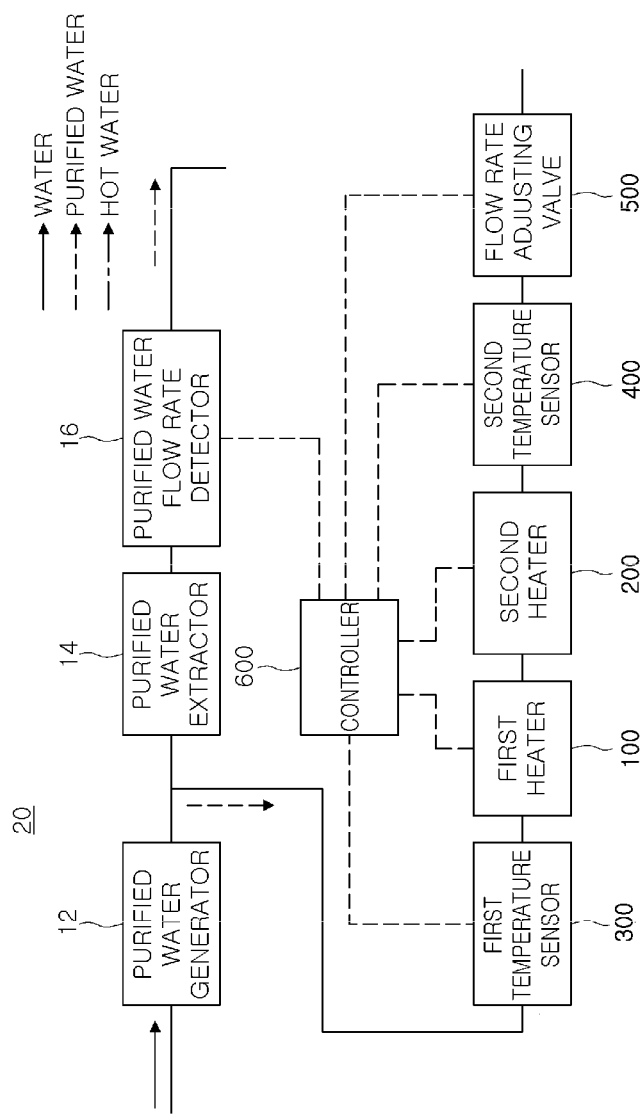
FIG. 5 is a block diagram illustrating a hot water supply device, according to another exemplary embodiment in the present disclosure.

FIG. 5 is a block diagram illustrating a hot water supply device, according to another exemplary embodiment in the present disclosure.

An exemplary embodiment of FIG. 5 is the same as that of FIG. 3 in basic configuration, relates to a hot water supply device 20 that may adjust a temperature of hot water by adjusting heating capacity of the first heater 100 or the second heater 200 by the controller 600, and differs from the exemplary embodiment of FIG. 3 in that a plurality of lookup tables for the heating capacity of the first heater 100 or the second heater 200 according to a difference between a target temperature and a temperature of water may be stored.

Here, the lookup tables may be a plurality of lookup tables for heating capacity of a heater according to a difference between a target temperature and a temperature of water per water inlet pressure.

For example, the controller 600 may include a fourth lookup table for heating capacity of a heater according to a difference between a target temperature and a temperature of water when water inlet pressure is 20 PSI, a fifth lookup table for heating capacity of a heater according to a difference between a target temperature and a temperature of water when water inlet pressure is 30 PSI, a sixth lookup table for heating capacity of a heater according to a difference between a target temperature and a temperature of water when water inlet pressure is 40 PSI, or the like.

Referring to FIG. 5, the controller 600 may calculate water inlet pressure of water flowing into the purified water generator 12 using a flow rate of extracted purified water corresponding to information on the flow rate of extracted purified water input from the purified water flow rate detector 16.

Further, the controller 600 may select any one of a plurality of lookup tables for heating capacity of the first heater 100 or the second heater 200 according to a difference between the target temperature and a temperature of water based on the calculated water inlet pressure, and may adjust a temperature of hot water by adjusting the heating capacity of the first heater 100 or the second heater 200 using the selected lookup table.

For example, the controller 600 may select the fourth lookup table when the calculated water inlet pressure is 20 PSI, and may adjust the heating capacity of the first heater 100 or the second heater 200 according to a difference between a target temperature and a temperature of the purified water using the fourth lookup table.

In the case of the hot water supply device 20 adjusting a temperature of hot water by adjusting the heating capacity of the first heater 100 or the second heater 200, a problem may occur in which, when water inlet pressure varies, hot water having a target temperature may not be generated as in the hot water supply device 10 adjusting a temperature of hot water by adjusting a flow rate.

Thus, the hot water supply device 20, according to an exemplary embodiment in the present disclosure, may store a plurality of lookup tables for controlling heating capacity of a heater according to water inlet pressure, may select a proper lookup table according to the water inlet pressure, and may control a flow rate, based on the selected proper lookup table, thereby generating hot water having a desired temperature, regardless of changes in the water inlet pressure, according to installation locations or installation conditions.

In an exemplary embodiment, the controller 600 may calculate water inlet pressure, when a user inputs initial settings, or in each preset cycle, and may select a lookup table according to the calculated water inlet pressure.

Figure 6:
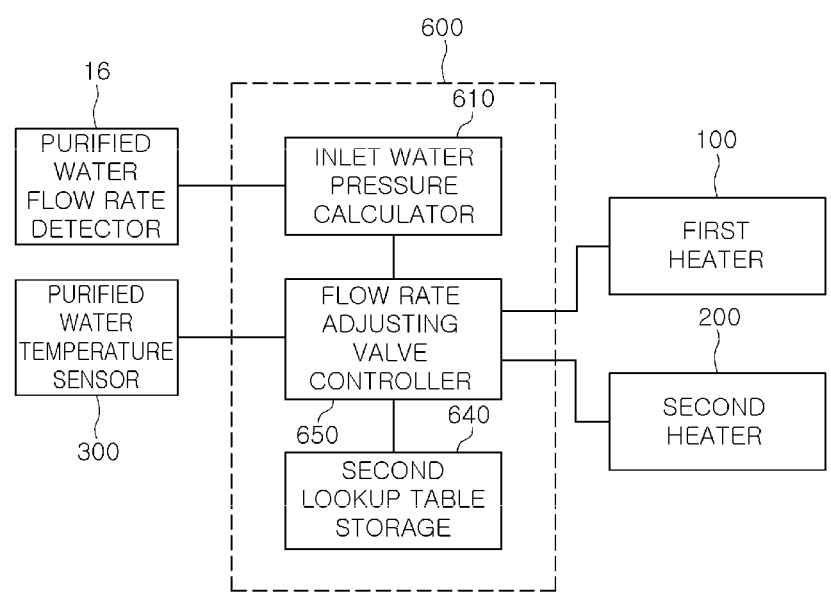
FIG. 6 is a block diagram illustrating an exemplary embodiment of a control unit of FIG. 5.

FIG. 6 is a block diagram illustrating an exemplary embodiment of the control unit of FIG. 5.

The controller 600, according to an exemplary embodiment in the present disclosure, may include a water inlet pressure calculator 610, a second lookup table storage 640, and a heater controller 650.

The water inlet pressure calculator 610 may calculate water inlet pressure of water flowing into the purified water generator 12, based on a flow rate of extracted purified water corresponding to information on the flow rate of extracted purified water input from the purified water flow rate detector 16. Here, the relationship between the flow rate of extracted purified water and the water inlet pressure may be produced using a lookup table according to a previously experimentally calculated or obtained result, or using a formula obtained by the relationship.

The second lookup table storage 640 may store a plurality of lookup tables for heating capacity of a heater according to a difference between a target temperature and a temperature of water per water inlet pressure.

The heater controller 650 may select any one of the lookup tables stored in the second lookup table storage 640 according to the water inlet pressure calculated by the water inlet pressure calculator 610, and may adjust heating capacity of the first heater 100 or the second heater 200 using the selected lookup table.

According to an exemplary embodiment in the present disclosure, a water purifier (not illustrated) including the hot water supply device of FIGS. 1 to 6 described above and providing hot water generated by the hot water supply device may be provided.

Hereinafter, referring to FIGS. 7 to 11, a hot water supply method, according to an exemplary embodiment in the present disclosure, will be described. Merely, the hot water supply method to be described below may be performed by the hot water supply device described above with reference to FIGS. 1 to 6. Thus, a description of elements the same as or corresponding to those of the above description will not be repeated.

Figure 7:
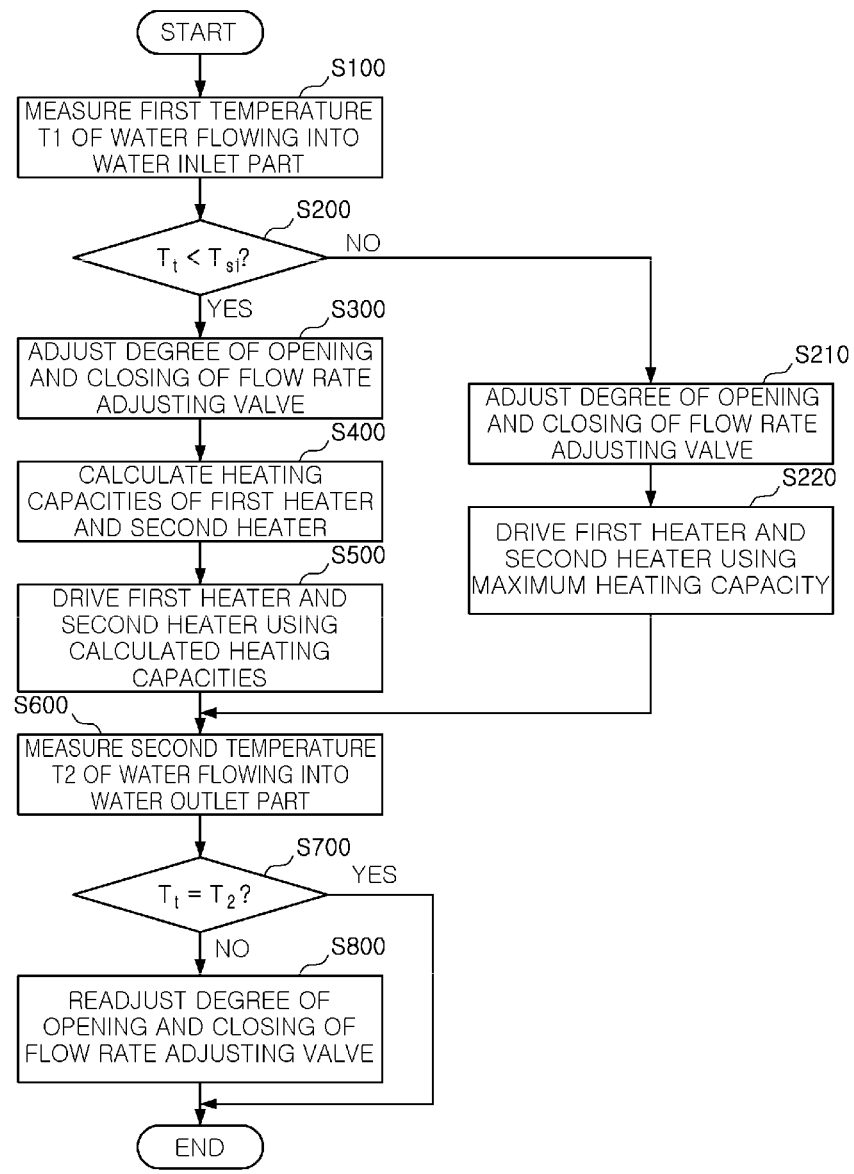
FIG. 7 is a flowchart illustrating a hot water supply method, according to an exemplary embodiment in the present disclosure.

FIG. 7 is a flowchart illustrating a hot water supply method, according to an exemplary embodiment in the present disclosure.

Referring to FIG. 7, in the hot water supply method, according to an exemplary embodiment in the present disclosure, the first temperature sensor 300 may first measure a temperature of water flowing into the water inlet part to generate first temperature information (S100). Here, the first temperature information may include a first temperature $T_1$.

Next, when a target temperature $T_t$ input from the outside is lower than a first reference temperature $T_{s1}$ (S200), the controller 600 may adjust the degree of opening and closing of the flow rate adjusting valve 500, based on a difference between a target temperature $T_t$ and the first temperature $T_1$ (S300).

In an exemplary embodiment, the controller 600 may adjust the degree of opening and closing of the flow rate adjusting valve 500 according to the difference between the target temperature $T_t$ and the first temperature $T_1$ of water flowing into the water inlet part, and may reduce the degree of opening of the flow rate adjusting valve 500 as the difference increases.

In another exemplary embodiment, the controller 600 may adjust the degree of opening and closing of the flow rate adjusting valve 500 using a lookup table for the degree of opening and closing of the flow rate adjusting valve 500 according to the difference between the first temperature $T_1$ of water flowing into the water inlet part and the target temperature $T_t$.

Next, the controller 600 may calculate heating capacities of the first heater 100 and the second heater 200, based on the difference between the first temperature $T_1$ and the target temperature $T_t$ (S400).

Next, the controller 600 may drive the first heater 100 and the second heater 200 using the calculated heating capacities (S500).

Next, the second temperature sensor 400 may measure a temperature of water discharged to the water outlet part to generate second temperature information (S600). Here, the second temperature information may include a second temperature $T_2$.

Next, when the second temperature $T_2$ is different from the target temperature $T_t$ (S700), the controller 600 may readjust the degree of opening and closing of the flow rate adjusting valve 500 according to a difference between the second temperature $T_2$ and the target temperature $T_t$ (S800).

Here, the controller 600 may adjust the degree of opening and closing of the flow rate adjusting valve 500 such that a flow rate of water discharged to the water outlet part may decrease as the difference between the second temperature $T_2$ and the target temperature $T_t$ increases, or may readjust the degree of opening and closing of the flow rate adjusting valve 500 using a lookup table for the degree of opening and closing of the flow rate adjusting valve 500 according to the difference between the second temperature $T_2$ and the target temperature $T_t$.

Here, the readjusting of the degree of opening and closing of the flow rate adjusting valve 500 (S800) may be provided to readjust the degree of opening and closing of the flow rate adjusting valve 500 when a difference between a temperature (the second temperature $T_2$) of water heated by the first heater 100 and the second heater 200 and the target temperature $T_t$ occurs, and may include allowing the controller 600 to recalculate heating capacity of the second heater 200, based on the difference between the second temperature $T_2$ and the target temperature $T_t$, when the opening and closing adjustment range exceeds an adjustable range within which the degree of opening and closing of the flow rate adjusting valve 500 may be adjusted (when the difference between the second temperature $T_2$ and the target temperature $T_t$ is beyond a preset temperature range) and to readjust the heating capacity of the second heater 200 to the calculated heating capacity.

In an exemplary embodiment, when the target temperature $T_t$ is equal to or higher than the first reference temperature $T_{s1}$, between the measuring of the first temperature $T_1$ of water flowing into the water inlet part (S100) and the measuring of the second temperature $T_2$ of water discharged to the water outlet part (S600), adjusting the degree of opening and closing of the flow rate adjusting valve 500, based on the difference between the first temperature $T_1$ of water flowing into the water inlet part and the target temperature $T_t$ (S210) and driving the first heater 100 and the second heater 200 using the maximum heating capacity (S220) may be included.

Figure 8:
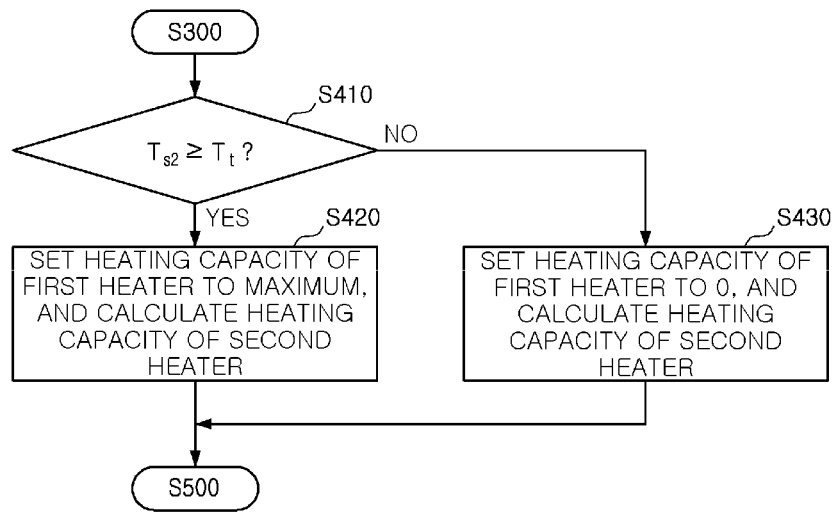
FIG. 8 is a flowchart illustrating an exemplary embodiment of calculating heating capacities of a first heater and a second heater of FIG. 7.

FIG. 8 is a flowchart illustrating an exemplary embodiment of the calculating of heating capacities of the first heater and the second heater of FIG. 7.

Referring to FIG. 8, when a magnitude of the target temperature $T_t$ is equal to or higher than the second reference temperature $T_{s2}$ (S410), the controller 600 may set the heating capacity of the first heater 100 to the maximum heating capacity, and may calculate the heating capacity of the second heater 200 using the heating capacity of the first heater 100, the degree of opening and closing of the flow rate adjusting valve 500, and the difference between the first temperature $T_1$ of water flowing into the water inlet part and the target temperature $T_t$ (S420).

Here, when the magnitude of the target temperature $T_t$ is lower than the second reference temperature $T_{s2}$ (S410), the controller 600 may set the heating capacity of the first heater 100 to 0, and may calculate the heating capacity of the second heater 200 using the degree of opening and closing of the flow rate adjusting valve 500 and the difference between the first temperature $T_1$ of water flowing into the water inlet part and the target temperature $T_t$ (S430).

Figure 9:
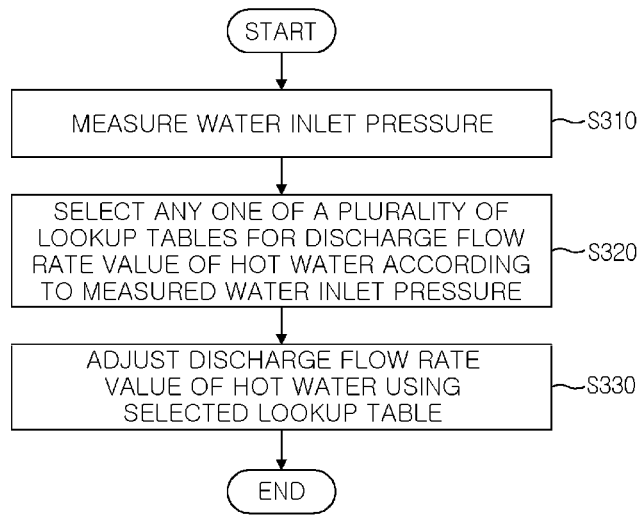
FIG. 9 is a flowchart illustrating an exemplary embodiment of adjusting a degree of opening and closing of a flow rate adjusting valve of FIG. 7.
Figure 10:
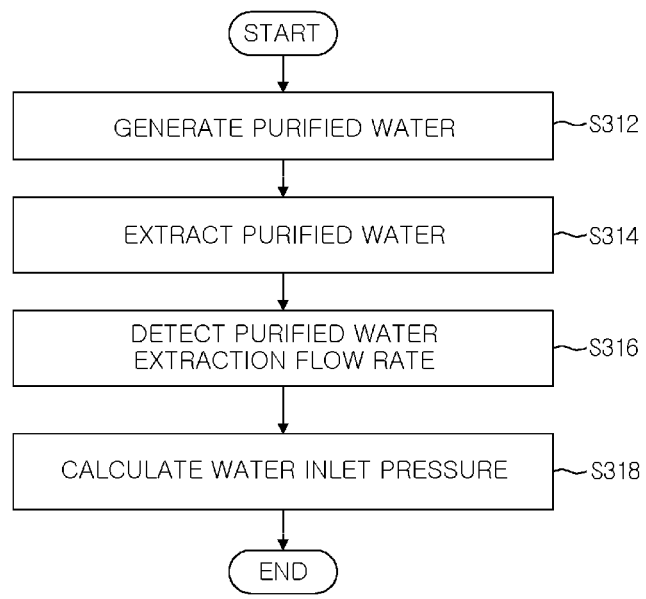
FIG. 10 is a flowchart illustrating an exemplary embodiment of measuring water inlet pressure of FIG. 9.

FIG. 9 is a flowchart illustrating an exemplary embodiment of the adjusting of the degree of opening and closing of the flow rate adjusting valve of FIG. 7. FIG. 10 is a flowchart illustrating an exemplary embodiment of measuring water inlet pressure of FIG. 9.

Referring to FIG. 9, the controller 600 may measure water inlet pressure of flowing water (S310). Here, the measuring of the water inlet pressure of water (S310) may include generating purified water by filtering water flowing from a water source (not illustrated) by the purified water generator 12 (S312), extracting the generated purified water to the outside by the purified water extractor 14 (S314), detecting a flow rate of the extracted purified water discharged through the purified water extractor 14 by the purified water flow rate detector 16 (S316), and calculating water inlet pressure of water flowing into the purified water generator 12 by the controller 600 using the flow rate of the extracted purified water (S318).

Returning again to FIG. 9, the controller 600 may select any one of a plurality of prestored lookup tables for a flow rate of hot water according to a difference between a target temperature and a temperature of the water purifier, based on the calculated water inlet pressure (S320).

Next, the controller 600 may adjust the flow rate of hot water using the selected lookup table (S330). Here, the controller 600 may adjust the flow rate of hot water by adjusting the degree of opening and closing of the flow rate adjusting valve 500.

An exemplary embodiment of the adjusting of the degree of opening and closing of the flow rate adjusting valve described above may be performed in S210, S300, and S800 of FIG. 7.

Figure 11:
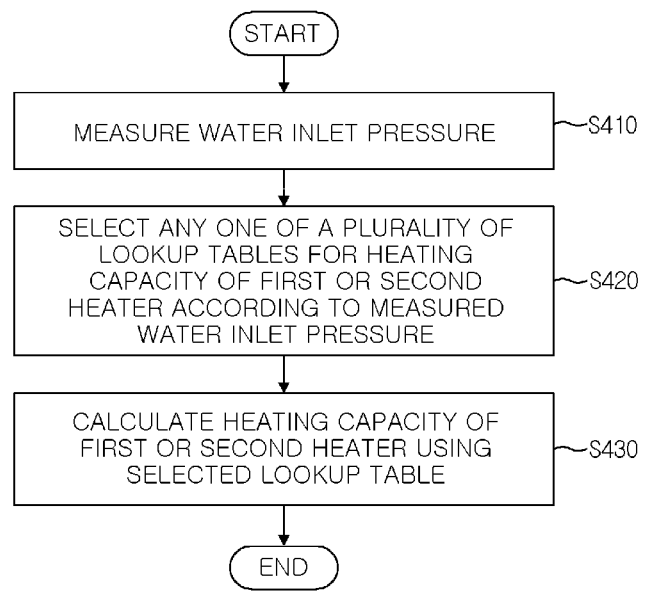
FIG. 11 is a flowchart illustrating an exemplary embodiment of calculating heating capacity of FIG. 7.

FIG. 11 is a flowchart illustrating an exemplary embodiment of the calculating of the heating capacity of FIG. 7.

Referring to FIG. 11, the controller 600 may measure water inlet pressure of flowing water (S410). Here, the measuring of the water inlet pressure of water (S410) may include calculating the water inlet pressure by performing the above-mentioned exemplary embodiment with reference to FIG. 10.

Next, the controller 600 may select any one of a plurality of prestored lookup tables for heating capacity of a heater according to a difference between a target temperature and a temperature of a water purifier, based on the calculated water inlet pressure (S420).

Next, the controller 600 may calculate heating capacity of the first heater 100 or the second heater 200 using the selected lookup table (S430).

While exemplary embodiments have been shown and described above, it will be apparent to those skilled in the art that modifications and variations could be made without departing from the scope of the present invention, as defined by the appended claims.

The invention claimed is:

1. A hot water supply device comprising:
   a first heater and a second heater disposed between a water inlet part and a water outlet part;
   a first temperature sensor generating first temperature information by measuring a temperature of water flowing into the water inlet part;
   a second temperature sensor generating second temperature information by measuring a temperature of water discharged to the water outlet part;
   a flow rate adjusting valve adjusting a flow rate of water discharged to the water outlet part; and
   a controller driving the first heater or the second heater according to a target temperature, adjusting a degree of opening and closing of the flow rate adjusting valve, based on a difference between a first temperature corresponding to the first temperature information and the target temperature, and readjusting the degree of opening and closing of the flow rate adjusting valve, based on a difference between a second temperature corresponding to the second temperature information and the target temperature.

2. The hot water supply device of claim 1, wherein the controller calculates heating capacities of the first heater and the second heater, based on the degree of opening and closing of the flow rate adjusting valve and the difference between the first temperature and the target temperature, and drives the first heater and the second heater using the calculated heating capacities.

3. The hot water supply device of claim 1, wherein, when the target temperature is lower than a first reference temperature and the difference between the target temperature and the temperature of the flowing water is equal to or higher than a second reference temperature, the controller drives the first heater using the maximum heating capacity, calculates heating capacity of the second heater using the heating capacity of the first heater, the degree of opening and closing of the flow rate adjusting valve, and the difference between the target temperature and the first temperature, and drives the second heater using the calculated heating capacity.

4. The hot water supply device of claim 1, wherein, when the target temperature is lower than a first reference temperature and the difference between the target temperature and the temperature of the flowing water is lower than a second reference temperature, the controller turns off the first heater, calculates heating capacity of the second heater using the degree of opening and closing of the flow rate adjusting valve and the difference between the target temperature and the first temperature, and drives the second heater using the calculated heating capacity.

5. The hot water supply device of claim 1, further comprising:
   a purified water generator generating purified water by filtering flowing water;
   a purified water extractor extracting the purified water; and
   a purified water flow rate detector detecting a flow rate of the purified water extracted by the purified water extractor,
   wherein the purified water generated by the purified water generator flows into the water inlet part, and the controller calculates water inlet pressure of the water flowing into the purified water generator using the flow rate of the extracted purified water, stores a plurality of lookup tables for a flow rate of hot water according to the difference between the target temperature and the first temperature, selects any one of the lookup tables according to the calculated water inlet pressure, and adjusts the degree of opening and closing of the flow rate adjusting valve using the selected lookup table.

6. The hot water supply device of claim 5, wherein, when the second temperature does not reach the target temperature, the controller readjusts the degree of opening and closing of the flow rate adjusting valve using the selected lookup table.

7. The hot water supply device of claim 6, wherein the controller includes:
   a water inlet pressure calculator calculating the water inlet pressure of the water flowing into the purified water generator using the flow rate of the extracted purified water;
   a first lookup table storage storing a plurality of lookup tables for a flow rate of hot water according to a difference between the target temperature and a temperature of the purified water; and
   a flow rate adjusting valve controller selecting any one of the lookup tables according to the calculated water inlet pressure, and adjusting the degree of opening and closing of the flow rate adjusting valve using the selected lookup table.

8. The hot water supply device of claim 1, wherein the controller includes:
   a calculator calculating the degree of opening and closing of the flow rate adjusting valve, based on the difference between the first temperature and the target temperature, calculating heating capacities of the first heater and the second heater, based on a magnitude of the target temperature, the degree of opening and closing of the flow rate adjusting valve, and the difference between the first temperature and the target temperature, and recalculating the degree of opening and closing of the flow rate adjusting valve or the heating capacity of the second heater, based on the difference between the second temperature and the target temperature;
   a heater controller driving the first heater and the second heater using the calculated heating capacities; and a flow rate adjusting valve controller controlling the flow rate adjusting valve according to the calculated opening and closing degree.

9. The hot water supply device of claim 8, wherein, when the target temperature is lower than a first reference temperature and the difference between the target temperature and the temperature of the flowing water is equal to or higher than a second reference temperature, the calculator sets the heating capacity of the first heater to the maximum heating capacity, and calculates the heating capacity of the second heater, based on the heating capacity of the first heater, the degree of opening and closing of the flow rate adjusting valve, and the difference between the first temperature and the target temperature.

10. The hot water supply device of claim 8, wherein, when the target temperature is lower than a first reference temperature and the difference between the target temperature and the temperature of the flowing water is lower than a second reference temperature, the calculator sets the heating capacity of the first heater to 0, and calculates the heating capacity of the second heater, based on the degree of opening and closing of the flow rate adjusting valve and the difference between the first temperature and the target temperature.

11. The hot water supply device of claim 1, further comprising:
   a purified water generator generating purified water by filtering flowing water;
   a purified water extractor extracting the purified water; and
   a purified water flow rate detector detecting a flow rate of the purified water extracted by the purified water extractor,
   wherein the purified water generated by the purified water generator flows into the water inlet part, and the controller calculates water inlet pressure of the water flowing into the purified water generator using the flow rate of the extracted purified water, stores a plurality of lookup tables for heating capacities of the first heater and the second heater according to the difference between the target temperature and the first temperature, selects any one of the lookup tables according to the calculated water inlet pressure, and adjusts the heating capacity of the first heater or the second heater using the selected lookup table.

12. The hot water supply device of claim 11, wherein, when the second temperature does not reach the target temperature, the controller adjusts the degree of opening and closing of the flow rate adjusting valve using a lookup table for the degree of opening and closing of the flow rate adjusting valve according to the difference between the second temperature and the target temperature.

13. The hot water supply device of claim 11, wherein the controller includes:
   a water inlet pressure calculator calculating the water inlet pressure of the water flowing into the purified water generator using the flow rate of the extracted purified water;
   a second lookup table storage storing a plurality of lookup tables for power according to the difference between the target temperature and the first temperature; and
   a heater controller selecting any one of the lookup tables according to the calculated water inlet pressure, and adjusting the heating capacity of the first heater or the second heater using the selected lookup table.

14. A hot water supply method using a hot water supply device including a first heater and a second heater disposed between a water inlet part and a water outlet part and a flow rate adjusting valve adjusting a flow rate of water discharged to the water outlet part, the hot water supply method comprising:
   measuring a temperature of water flowing into the water inlet part;
   when a target temperature is lower than a first reference temperature, adjusting a degree of opening and closing of the flow rate adjusting valve, based on a difference between the temperature of water flowing into the water inlet part and the target temperature;
   calculating heating capacities of the first heater and the second heater, based on the difference between the temperature of water flowing into the water inlet part and the target temperature;
   driving the first heater and the second heater using the calculated heating capacities;
   measuring a temperature of water discharged to the water outlet part; and
   readjusting the degree of opening and closing of the flow rate adjusting valve, based on a difference between the temperature of water discharged to the water outlet part and the target temperature.

15. The hot water supply method of claim 14, wherein the adjusting the degree of opening and closing of the flow rate adjusting valve includes:
   measuring water inlet pressure of the flowing water;
   selecting any one of a plurality of prestored lookup tables for a degree of opening and closing of the flow rate adjusting valve according to a difference between a target temperature and a temperature of the water, based on the measured water inlet pressure; and
   adjusting a degree of opening and closing of the flow rate adjusting valve using the selected lookup table.

16. The hot water supply method of claim 15, wherein the readjusting the degree of opening and closing of the flow rate adjusting valve includes: readjusting a degree of opening and closing of the flow rate adjusting valve using the selected lookup table.

17. The hot water supply method of claim 14, wherein the calculating the heating capacities of the first heater and the second heater includes:
   when the difference between the target temperature and the temperature of the flowing water is equal to or higher than a second reference temperature,
   setting the heating capacity of the first heater to the maximum heating capacity; and
   calculating the heating capacity of the second heater using the heating capacity of the first heater, the degree of opening and closing of the flow rate adjusting valve, and the difference between the temperature of water flowing into the water inlet part and the target temperature.

18. The hot water supply method of claim 14, wherein the calculating the heating capacities of the first heater and the second heater includes:
   when the difference between the target temperature and the temperature of the flowing water is lower than a second reference temperature, setting the heating capacity of the first heater to 0; and
   calculating the heating capacity of the second heater using the degree of opening and closing of the flow rate adjusting valve and the difference between the temperature of water flowing into the water inlet part and the target temperature.

19. The hot water supply method of claim 14, wherein the calculating the heating capacities of the first heater and the second heater includes:
- measuring water inlet pressure of the flowing water;
- selecting any one of a plurality of prestored lookup tables for the heating capacities of the first heater and the second heater according to a difference between a target temperature and a temperature of the water, based on the measured water inlet pressure; and
- calculating the heating capacities of the first heater and the second heater using the selected lookup table.

20. The hot water supply method of claim 19, wherein the adjusting the degree of opening and closing of the flow rate adjusting valve includes:
- measuring water inlet pressure of the flowing water;
- selecting any one of a plurality of prestored lookup tables for a degree of opening and closing of the flow rate adjusting valve according to a difference between a target temperature and a temperature of the water, based on the measured water inlet pressure; and
- adjusting the degree of opening and closing of the flow rate adjusting valve using the selected lookup table.

21. The hot water supply method of claim 20, wherein the readjusting the degree of opening and closing of the flow rate adjusting valve includes: readjusting a degree of opening and closing of the flow rate adjusting valve using the selected lookup table.

\* \* \* \* \*